United States Patent [19]

Dreano

[11] Patent Number: 4,992,287

[45] Date of Patent: Feb. 12, 1991

[54] PROCESS FOR TREATMENT OF MEAT

[76] Inventor: Claude Dreano, rue de Perhan, 56490 Guilliers, France

[21] Appl. No.: 384,856

[22] Filed: Jul. 21, 1989

Related U.S. Application Data

[63] Continuation of Ser. No. 125,461, Nov. 25, 1987, abandoned.

[30] Foreign Application Priority Data

Dec. 2, 1986 [FR] France ............... 86 16960

[51] Int. Cl.$^5$ ........................................... A23L 3/3418
[52] U.S. Cl. ..................................... 426/418; 426/519
[58] Field of Search ............... 426/312, 641, 665, 418, 426/519, 281

[56] References Cited

U.S. PATENT DOCUMENTS

| | | | |
|---|---|---|---|
| 474,446 | 5/1892 | Fey | 99/535 |
| 2,629,311 | 2/1953 | Graves | 426/281 X |
| 3,245,336 | 4/1966 | Blickman | |
| 3,804,962 | 4/1974 | Pipkins | 426/418 |
| 3,843,810 | 10/1974 | Fehmerling | 426/204 |
| 4,018,908 | 4/1977 | Gross | 426/281 |
| 4,229,458 | 10/1980 | Dreano et al. | 426/641 X |
| 4,356,206 | 10/1982 | Boldt | 426/519 |
| 4,357,903 | 11/1982 | Moss | 119/15 |
| 4,498,378 | 2/1985 | Norrie | 99/472 |

FOREIGN PATENT DOCUMENTS

| | | |
|---|---|---|
| 1153928 | 9/1983 | Canada . |
| 1955266 | 5/1971 | Fed. Rep. of Germany . |
| 543755 | 9/1922 | France . |
| 2357182 | 2/1978 | France . |
| 2394250 | 1/1979 | France . |
| 2460113 | 1/1981 | France . |
| 374611 | 6/1932 | United Kingdom . |
| 431994 | 7/1935 | United Kingdom . |

*Primary Examiner*—Arthur L. Corbin
*Attorney, Agent, or Firm*—Laff Whitesel Conte & Saret

[57] ABSTRACT

A procedure for processing meat to tenderize it and/or improve its texture and its appearance during storage or preservation, characterized by the steps of introducing the meat into an enclosure, placing it under vacuum, pressurizing it to a pressure above atmospheric pressure with a compressed gas, which is preferably sterile, and then returning the enclosure to atmospheric pressure.

13 Claims, 1 Drawing Sheet

PROCESS FOR TREATMENT OF MEAT

This application is a continuation of application Ser. No. 07/125,461, filed Nov. 25, 1987, now abandoned.

The present invention relates to meat processing in general, and more particularly to a procedure for improving the texture and appearance of the meat upon preservation in a cold room or during thawing, and for tenderizing the meat.

BACKGROUND OF THE INVENTION

Generally, once fresh meat is cut up, it is conserved for a period of time before being consumed. In some cases, in particular for beef, relatively long storage is necessary in a cold room to let the meat go stale, otherwise it is improper for consumption.

During storage in a cold room, the meat releases liquids which are lost, the nutritional value of which is not negligible. Of course there is an overall measurable loss of weight. Furthermore, the liquids which are released are prone to germs and bacteria.

For red meats, storage in a cold room can last in principle for up to ten days at temperatures of between 2 to 4° C. If the meat is stored somewhat longer, it takes on a brown coloring which makes it unappetizing and difficult to sell.

In the event the meat is frozen, these inconveniences do not occur during storage, however the loss of liquids, and consequently the loss of weight which occurs during thawing still present a problem.

The present invention comprises subjecting the meat to a process which either considerably reduces or totally eliminates the release of liquids, thereby enabling cold room storage or preservation of meat over extended periods of time without the risk of weight loss and color change.

The process according to the present invention also results in considerable tenderizing of the meat. Until now, it was known to tenderize meats with an apparatus provided with needles for penetrating and vibrating pieces of meat. This process, although providing satisfactory results, has been found to present severe hygiene risks. The needles have been found to introduce germs deep into the meat or, in the event the needles are inserted into and withdrawn from a defective piece of meat, other pieces of meat subsequently treated by the same needles have been found to become contaminated. The use of such apparatus has now been disallowed. Since this prior art approach was the only known tenderizing process, an important percentage of the production, in particular of red meat, is now not available although having excellent nutritional and taste qualities.

Thus, another purpose of the invention is to tenderize the meat without the prior art negative consequences in terms of poor hygiene.

SUMMARY OF THE INVENTION

In accordance with a characteristic of the invention, the process comprises the steps of introducing the fresh meat into an enclosure, placing it under vacuum, then establishing a pressure greater than atmospheric pressure with a compressed gas, such as air, which is preferably sterile.

In accordance with another characteristic of the invention, the cycle comprised of putting the enclosure under vacuum and then establishing a pressure greater than atmospheric pressure is repeated a number of times.

In accordance with another characteristic, the phase preceding the return to atmospheric pressure for the opening of the enclosure and the removal of the pieces is a low pressure phase.

In accordance with another characteristic of the invention, the enclosure turns on itself like a churn during the low pressure - high pressure cycles.

The invention is also a meat thawing process comprising the steps of introducing frozen pieces of meat into the above-mentioned enclosure, to place it under vacuum and then establish a pressure greater than atmospheric with a compressed gas, such as air, which is preferably sterile, the vacuum-pressure cycle being repeated a number of times during thawing.

Finally, the process of the invention has been found to be satisfactory when it is applied to meat that has been previously thawed.

BRIEF DESCRIPTION OF THE DRAWING

Trials have also been carried out with an apparatus capable of pickling meats and which is shown in the attached drawing. An apparatus, essentially similar to the latter, and the said pickling process are described in the U.S. Pat. No. 4,229,458 submitted on Apr. 17th, 1987 in the name of the present applicant.

DESCRIPTION OF THE PREFERRED EMBODIMENT

Figure 1:
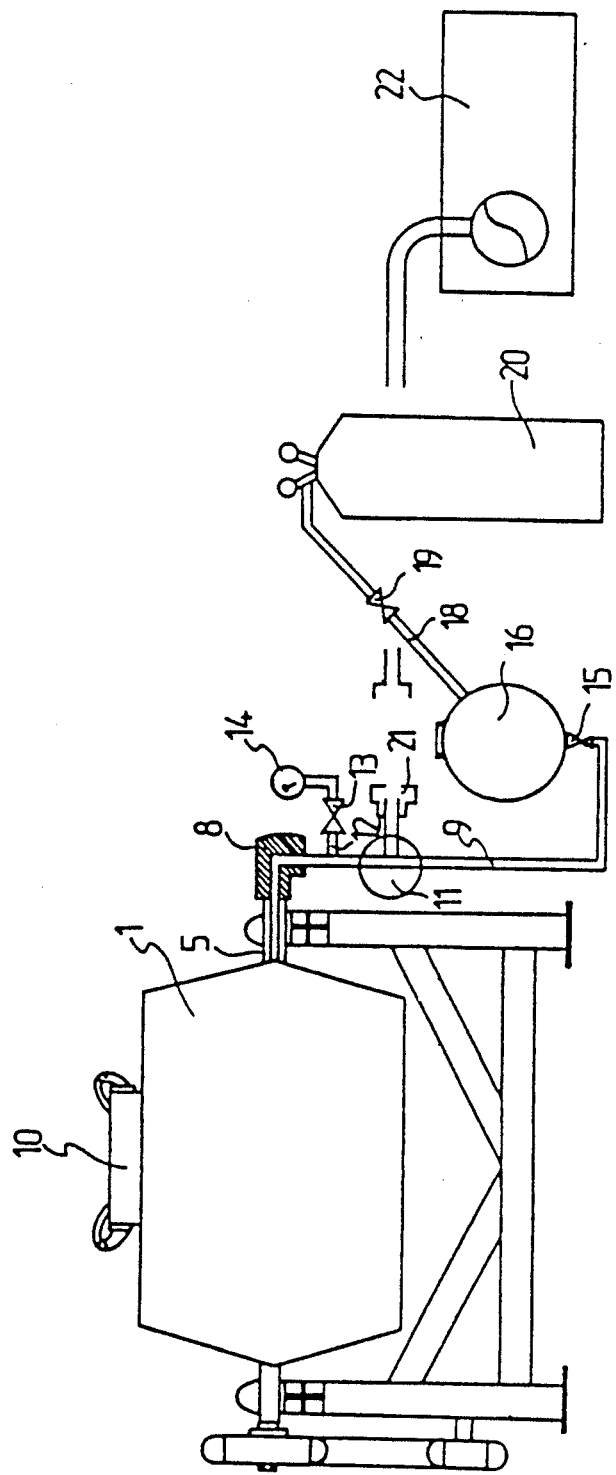

The apparatus shown in the drawing comprises an enclosure in the form of a churn 1 capable of rotating around itself by means of a motor. By its axis of rotation 5 and a hollow spinning joint 8, the interior of the churn 1 communicates with an exterior conduit 9. The churn 1 also has a sealed door 10 capable, when closed, of supporting in the interior a vacuum of a few Torr and an overpressure of a few bars.

The exterior conduit 9 connects the spinning joint 8 to a drain 12 to which are connected four stop valves 11, 13, 15 and 19. The valve 11 is a free air valve. The valve 13 connects the drain 12 to a vacuum system 21, 22. The valve 15 is connected to a tank 16 and the valve 19 is connected by a conduit 18 to a source of compressed gas 20, such as air, which is preferably sterile.

The tank 16 is provided to contain the pickling liquid before the beginning of the pickling operation as instructed in the above-mentioned U.S. Pat. No. 4,229,458.

Thus, to carry out the process of the invention, the valve 15 between the container 16 and the drain 12 remains permanently closed. In an apparatus specially designed to carry out the process of the invention, the valve 15 and the tank 16 are removed.

Initially, the valves 13, 15 and 19 are closed, and only the free air valve 11 is open. The door 10 is opened to dump into the churn 1 the quantity of pieces of meat to be treated, and then the door is closed. The churn is set spinning and the valve 11 is closed. The churn 1 is placed under vacuum by opening valve 13 and by operating the vacuum pump 22. When the desired vacuum which the pump can provide has been reached, the valve 13 is closed. After a first predetermined delay, the valve 19 is opened to introduce pressurized air into the churn 1. The pressure is controlled by a sensor 14 on drain 12. When the desired pressure level is achieved, valve 19 is closed. After a second predetermined delay, valve 13 is opened to reduce the gas pressure in the churn. The reduction in pressure is monitored by the sensor, and valve 13 is closed when the desired vacuum is reached. The operation of reducing and increasing the pressure is carried out a number of times before exposing the inside of churn 1 to free air. At that time, the door 10 is opened and the pieces of meat are removed.

A first series of trials were carried out in which the above-described process was applied to fresh pieces of red meat. It was observed that the meat had not released liquids in the churn 1 and that the meat was considerably tenderized. The treated meat was then stored in a cold room. It was found that the stored meat processed as described above did not release any liquids, or at least very little compared to untreated meat. It was further observed that the meat could remain for longer periods of time in cold storage than previously known without spoiling and without changing to an ugly brownish color. On the contrary, it was found that red meats maintained their fresh reddish color.

During another set of trials, the meat was frozen after being treated. As previously discovered, the meat was considerably tenderized and, furthermore, the loss of liquids during thawing was considerably reduced.

A third set of trials were conducted in which normally frozen pieces of meat were introduced into the churn 1. While spinning the churn, low pressure - high pressure cycles were carried out during the entire thawing time. It was observed, again, that the meat released only a small amount of liquids and that it became considerably tenderized. Furthermore, the loss of weight after cooking was greatly reduced. Identical results were obtained when the process was applied to previously unthawed meat.

During the different trials, the treated meat was subjected to cooking and it was observed that the weight losses were considerably reduced.

With reference to the above-described process, a cycle has been defined as consisting of a pressure reduction phase followed by a pressure increase phase. This does not imply that the churn is necessarily at high pressure just before re-establishing atmospheric pressure by opening of the latter at the end of treatment. Depending on the circumstances, the process can end on either a high pressure or a low pressure phase, such that atmospheric pressure can be re-established progressively.

In practice, trials were successful where, from one phase to the other, the pressure varied between a few Torr and a bit less than 4 bars. These values are only given by way of example. The processing procedure of the invention can, of course, be applied to all meats, including poultry and wild meats. It can also be used for fish.

I claim:

1. A non-pickling process for tenderizing meat and/or improving its appearance to reduce the release of liquids from the meat during cold room storage thereof substantially without risk of loss of weight or color change in said meat, said process comprising the steps of introducing the meat into a rotatable enclosure which is and remains free of liquid or other preservatives, placing the enclosure under vacuum, establishing a pressure within the enclosure which is greater than atmospheric pressure by introducing into said enclosure compressed air which is substantially sterile, rotating said enclosure and then returning said enclosure to atmospheric pressure.

2. A process in accordance with claim 1, wherein the steps of placing the enclosure under vacuum and then establishing a pressure further comprises the steps of repeatedly establishing at least two cycles of low pressure - high pressure within the enclosure, said established high pressure being greater than atmospheric pressure.

3. A process in accordance with claim 1 or 2, wherein a low pressure phase precedes said return of said enclosure to atmospheric pressure and opening the enclosure and removing the meat follows said return of said enclosure to atmospheric pressure.

4. A processing procedure in accordance with claim 3 wherein said procedure is applied to frozen meat during thawing.

5. A processing procedure in accordance with claim 3 wherein said procedure is applied to meat before it is frozen.

6. A processing procedure in accordance with claim 3 wherein said procedure is applied to meat after thawing.

7. A process in accordance with claim 2, wherein said enclosure spins on itself in the manner of a churn during said low pressure - high pressure cycles in said repeated establishment of pressure cycles.

8. A processing procedure in accordance with claim 7 wherein said procedure is applied to frozen meat during thawing.

9. A processing procedure in accordance with claim 7 wherein said procedure is applied to meat before it is frozen.

10. A processing procedure in accordance with claim 7 wherein said procedure is applied to meat after thawing.

11. A processing procedure in accordance with one of claims 1 or 2 wherein said procedure is applied to frozen meat during thawing.

12. A processing procedure in accordance with one of claims 1 or 2, wherein said procedure is applied to meat before it is frozen.

13. A processing procedure in accordance with one of claims 1 or 2 wherein said procedure is applied to meat after thawing.

* * * * *